(12) United States Patent
Choi et al.

(10) Patent No.: US 11,845,382 B2
(45) Date of Patent: Dec. 19, 2023

(54) VEHICLE CONTROLLING SIDE MIRROR WHEN PERFORMING AUTOMATIC PARKING AND OPERATION METHOD OF THE SAME

(71) Applicants: Hyundai Motor Company, Seoul (KR); Kia Corporation, Seoul (KR)

(72) Inventors: Su Min Choi, Hwaseong-si (KR); Sun Woo Jeong, Siheung-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 141 days.

(21) Appl. No.: 17/342,889

(22) Filed: Jun. 9, 2021

(65) Prior Publication Data
US 2022/0203896 A1 Jun. 30, 2022

(30) Foreign Application Priority Data
Dec. 31, 2020 (KR) ........................ 10-2020-0189285

(51) Int. Cl.
| | |
|---|---|
| *B60R 1/07* | (2006.01) |
| *B60R 1/12* | (2006.01) |
| *B60R 21/0134* | (2006.01) |
| *B60W 30/08* | (2012.01) |
| *B60W 40/02* | (2006.01) |
| *B60W 40/105* | (2012.01) |
| *B60R 1/062* | (2006.01) |
| *B60W 30/06* | (2006.01) |
| *B60W 30/14* | (2006.01) |
| *B60W 30/09* | (2012.01) |
| *B60W 10/30* | (2006.01) |

(52) U.S. Cl.
CPC ............. *B60R 1/062* (2013.01); *B60W 10/30* (2013.01); *B60W 30/06* (2013.01); *B60W 30/09* (2013.01); *B60W 30/143* (2013.01); *B60W 2420/40* (2013.01); *B60W 2420/54* (2013.01); *B60W 2510/20* (2013.01); *B60W 2552/00* (2020.02)

(58) Field of Classification Search
CPC ... B60R 1/062; B60W 2552/00; B60W 10/30; B60W 30/06; B60W 30/09; B60W 30/143; B60W 2420/40; B60W 2420/54; B60W 2510/20
See application file for complete search history.

(56) References Cited

U.S. PATENT DOCUMENTS

| | | | | |
|---|---|---|---|---|
| 2010/0286875 | A1* | 11/2010 | Inoue .................. | B62D 15/027 701/49 |
| 2019/0031105 | A1* | 1/2019 | Kim ...................... | B60R 1/088 |
| 2019/0047473 | A1* | 2/2019 | Pohl ..................... | G08G 1/166 |

FOREIGN PATENT DOCUMENTS

KR            102316713 B1 *  5/2020   ............. B60R 1/072

OTHER PUBLICATIONS

KR102316713B1—Machine Translation (Year: 2020).*
Machine Translation—KR 102316713 B1—Shin et al.—May 2020 (Year: 2020).*

* cited by examiner

*Primary Examiner* — Jess Whittington
*Assistant Examiner* — Rami Nabih Bedewi
(74) *Attorney, Agent, or Firm* — Slater Matsil, LLP

(57) ABSTRACT

A vehicle includes a sensor device configured to collect data on regions around the vehicle, and an automatic parking controller configured to generate a folding signal or an unfolding signal for a side mirror based on the data collected by the sensor device and a state of the side mirror when performing automatic parking.

23 Claims, 11 Drawing Sheets

| IS INFORMATION ON FOLDING SIGNAL GENERATION STORED? | USER LOCATION | | |
|---|---|---|---|
| | INSIDE SECOND REGION (INSIDE FIRST REGION) | OUTSIDE SECOND REGION (INSIDE FIRST REGION) | OUTSIDE FIRST REGION |
| FOLDING BY FOLDING SIGNAL | IGNORE UNFOLDING REQUEST | PERMIT UNFOLDING REQUEST | IGNORE UNFOLDING REQUEST |
| FOLDING BY OTHER REASONS | IGNORE UNFOLDING REQUEST | PERMIT UNFOLDING REQUEST | PERMIT UNFOLDING REQUEST |

Fig.11

VEHICLE CONTROLLING SIDE MIRROR WHEN PERFORMING AUTOMATIC PARKING AND OPERATION METHOD OF THE SAME

CROSS-REFERENCE TO RELATED APPLICATIONS

This application claims the benefit of Korean Patent Application No. 10-2020-0189285, filed in the Korean Intellectual Property Office on Dec. 31, 2020, which application is hereby incorporated herein by reference.

TECHNICAL FIELD

The present disclosure relates to a vehicle that performs an automatic parking function.

BACKGROUND

An automatic parking function is a technology of searching a parking space through sensors mounted in front and rear portions of a vehicle and automatically supporting parking and unparking for the searched parking space. An automatic parking technology enables simple parking without separate manipulation of a user.

However, when performing the automatic parking, an ultrasonic sensor that collects data on regions around the vehicle may be located in each of front and rear bumpers of the vehicle, thereby causing a blind spot in a lateral region of the vehicle. Thus, when the vehicle relies on the ultrasonic sensors when performing the automatic parking, there is a risk of an unexpected collision between an obstacle and a side mirror.

In addition, when the side mirror that has been folded is always unfolded in response to a request from an external device, it may interfere with vehicle boarding of the user and may reduce user convenience.

SUMMARY

The present disclosure relates to a vehicle that performs an automatic parking function. Particular embodiments relate to a vehicle that prevents a collision between an object around the vehicle and a side mirror during the automatic parking. Embodiments of the present disclosure can solve problems occurring in the prior art while advantages achieved by the prior art are maintained intact.

An embodiment of the present disclosure provides a vehicle that generates a control signal for a side mirror to prevent a collision of the side mirror when performing automatic parking of the vehicle.

Another embodiment of the present disclosure provides a vehicle that complements a blind spot of ultrasonic sensors by utilizing both the ultrasonic sensors and omnidirectional cameras when performing the automatic parking.

Another embodiment of the present disclosure provides a vehicle that a user may easily board by utilizing a generation record of a folding signal for the side mirror and collected data when receiving an unfolding request for the side mirror from an external device.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, a vehicle includes a sensor device for collecting data on regions around the vehicle, and an automatic parking controller that generates a folding signal or an unfolding signal for a side mirror based on the data collected by the sensor device and a state of the side mirror when performing automatic parking.

In one implementation, the sensor device may include front and rear ultrasonic sensors and omnidirectional cameras, the front and rear ultrasonic sensors may collect first data on a region ahead of the vehicle and a region at the rear of the vehicle, the omnidirectional cameras may collect second data on the region ahead of the vehicle, the region at the rear of the vehicle, and a lateral region of the vehicle, and the omnidirectional cameras may include a front camera located on a front surface of the vehicle, a rear camera located on a rear surface of the vehicle, and a side camera located on the side mirror.

In one implementation, when the side mirror is unfolded, the automatic parking controller may generate information on a parking space based on the first data and the second data, and determine whether the vehicle is aligned in the parking space.

In one implementation, when the vehicle is aligned in the parking space, the automatic parking controller may generate information on a surrounding object based on the first data and the second data, and generate the folding signal when a half of a difference of a width of the parking space from a full width of the vehicle is within a first distance or when the surrounding object is sensed within a second distance from the vehicle.

In one implementation, when the vehicle is not aligned in the parking space, the automatic parking controller may generate information on a surrounding object based on the first data and the second data, and generate the folding signal when the surrounding object is sensed within a third distance from the vehicle.

In one implementation, the automatic parking controller may calculate a minimum folding distance based on a current speed of the vehicle, a distance between the surrounding object and the vehicle, and a time it takes to complete folding of the side mirror.

In one implementation, the automatic parking controller may generate the folding signal based on the minimum folding distance, the distance between the surrounding object and the vehicle, and a change in a steering angle of the vehicle.

In one implementation, when the distance between the surrounding object and the vehicle is smaller than the minimum folding distance, the automatic parking controller may control a speed of the vehicle based on the distance between the surrounding object and the vehicle and the time it takes to complete the folding of the side mirror.

In one implementation, when the side mirror is folded, the automatic parking controller may move the vehicle by a fourth distance, and generate information on a surrounding object based on the first data collected at the moved location.

In one implementation, the automatic parking controller may move the vehicle by the fourth distance again when the surrounding object is sensed within a fifth distance from the vehicle, and generate the unfolding signal when the surrounding object is not sensed within the fifth distance from the moved location.

In one implementation, the automatic parking controller may generate the unfolding signal when the surrounding object is not sensed within a fifth distance from the vehicle.

In one implementation, the automatic parking controller may store a generation record of the folding signal when the automatic parking is terminated, and generate the unfolding signal based on the first data, the generation record, and an unfolding request when receiving the unfolding request for the side mirror from an external device.

In one implementation, the automatic parking controller may generate information on a user location based on the first data, and ignore the unfolding request and not generate the unfolding signal when the user location is outside a first region and when there is the generation record.

In one implementation, the automatic parking controller may generate information on a user location based on the first data, and permit the unfolding request and generate the unfolding signal when the user location is outside a first region and when there is no generation record.

In one implementation, the automatic parking controller may regenerate the information on the user location based on the first data after generating the unfolding signal, and regenerate the folding signal when the user moves into a second region.

In one implementation, the automatic parking controller may generate information on a surrounding object based on the first data, and ignore the unfolding request and not generate the unfolding signal when the surrounding object is sensed in a second region from the vehicle.

According to another embodiment of the present disclosure, an operation method of a vehicle when performing an automatic parking function includes initiating automatic parking, collecting a state of a side mirror, collecting data on regions around the vehicle, generating a folding signal or an unfolding signal for the side mirror based on the state of the side mirror and the data, and determining whether the automatic parking has been completed and storing a generation record of the folding signal.

In one implementation, the collecting of the data on the regions around the vehicle may include collecting first data on a region ahead of the vehicle and a region at the rear of the vehicle through front and rear ultrasonic sensors, and collecting second data on the region ahead of the vehicle, the region at the rear of the vehicle, and a lateral region of the vehicle through omnidirectional cameras.

In one implementation, the generating of the folding signal or the unfolding signal for the side mirror based on the state of the side mirror and the data may include, when the side mirror is not folded, generating information on a parking space based on the first data and the second data, and determining whether the vehicle is aligned in the parking space.

In one implementation, the method may further include, when the vehicle is not aligned in the parking space, generating information on a surrounding object based on the first data and the second data, determining whether the surrounding object is sensed within a third distance from the vehicle, and generating the folding signal.

In one implementation, the method may further include, when the vehicle is aligned in the parking space, generating information on a surrounding object based on the first data and the second data, determining whether a half of a difference of a width of the parking space from a full width of the vehicle is within a first distance, when the half of the difference is greater than the first distance, determining whether the surrounding object is sensed within a second distance from the vehicle, and generating the folding signal.

In one implementation, the generating of the folding signal or the unfolding signal for the side mirror based on the state of the side mirror and the data may include, when the side mirror is folded, moving the vehicle by a fourth distance, collecting the first data at the moved location, generating information on a surrounding object based on the first data, and generating the unfolding signal when the surrounding object is not sensed within a fifth distance from the vehicle.

In one implementation, the generating of the folding signal or the unfolding signal for the side mirror based on the state of the side mirror and the data may include receiving an unfolding request for the side mirror from an external device, generating information on a user location and information on a surrounding object based on the first data, determining whether there is the generation record of the folding signal, determining whether the user location is within a first region, and determining whether the surrounding object is sensed within a second region.

BRIEF DESCRIPTION OF THE DRAWINGS

The above and other objects, features and advantages of embodiments of the present disclosure will be more apparent from the following detailed description taken in conjunction with the accompanying drawings, in which:

FIG. 11 illustrates an unfolding request permission condition according to an embodiment of the present disclosure.

DETAILED DESCRIPTION OF ILLUSTRATIVE EMBODIMENTS

Figure 1:
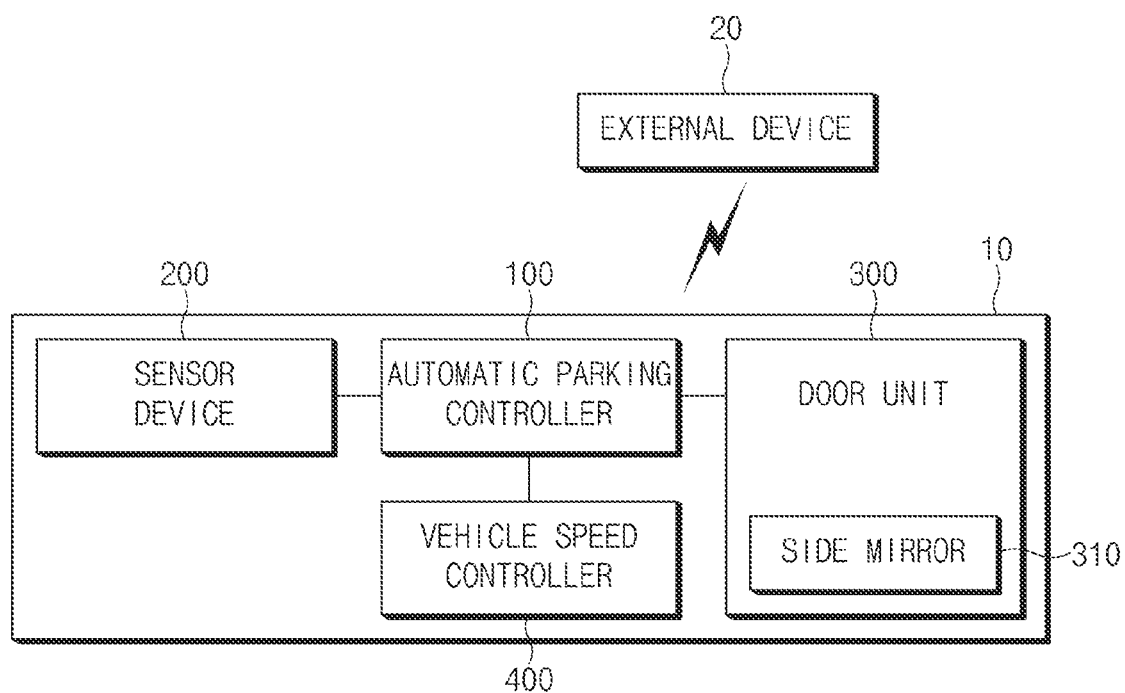
FIG. 1 illustrates a vehicle and an external device according to an embodiment of the present disclosure.

Hereinafter, embodiments of the present disclosure will be described in detail with reference to the exemplary drawings. Embodiments to be introduced below are only presented to fully convey the idea of the present disclosure to those with ordinary knowledge in the technical field to which the present disclosure belongs, and the present disclosure is not limited to only the presented embodiments. The present disclosure may be embodied in other embodiments. In the drawings, to clarify the present disclosure, the illustration of portions irrelevant to the description may be omitted, and the size and the like of the component may be somewhat exaggerated to help understanding.

In addition, in adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a vehicle 10 and an external device 20 according to an embodiment of the present disclosure.

As shown in FIG. 1, the vehicle 10 that performs an automatic parking function may communicate with the external device 20.

The external device 20 may transmit and receive signals with the vehicle 10 using a short-range communication technology. As the short-range communication technology, Bluetooth communication or infrared communication may be used as an example.

The external device 20 may refer to a wireless communication device portable by a user. The external device 20 may be implemented as a smart key, a display smart key, a smart phone, a tablet, a personal digital assistant (PDA), a portable multimedia player (PMP), and/or a laptop computer.

The external device 20 may include input means (not shown). The input means (not shown) may be implemented as a key pad, a button, a touch pad, a jog wheel, a jog switch, a toggle switch, or the like. The input means (not shown) is not limited thereto.

For example, when the external device 20 is the smart key, the external device 20 may include the input means (not shown) in the form of the button. The user may input a forward movement signal or a backward movement signal through the button, and may input a starting request and a vehicle un-lock request for the vehicle. The external device 20 may transmit the signal input by the user to the vehicle 10.

The vehicle 10 may include an automatic parking controller 100 that controls each component (e.g., a sensor device 200, a vehicle speed controller 400, a door unit 300, and the like) of the vehicle 10 when performing the automatic parking, the sensor device 200 that collects data on regions around the vehicle, the door unit 300 that controls a component (e.g., a side mirror 310, a door locking device, and the like) included in a door of the vehicle 10, and a vehicle speed controller 400 that controls a behavior of the vehicle 10. In addition, the vehicle 10 may include a communication device (not shown) capable of communicating with the external device 20 or an external communication network.

Each component (e.g., the automatic parking controller 100, the sensor device 200, the door unit 300, the vehicle speed controller 400, and the like) included in the vehicle 10 may include a processor (not shown) that performs control for each component. Each component may include a memory (not shown) that stores data for the control.

The processor (not shown) and the memory (not shown) may be individually included in each component (e.g., the automatic parking controller 100, the sensor device 200, the door unit 300, the vehicle speed controller 400, and the like) included in the vehicle 10, or may be implemented as one integrated processor (not shown) and one integrated memory (not shown).

The automatic parking function may refer to a function in which the vehicle 10 is parked by itself based on the data on the regions around the vehicle 10 even when the user does not directly drive the vehicle 10. The regions around the vehicle 10 may include a region ahead of the vehicle 10, a region at the rear of the vehicle 10, and a lateral region of the vehicle 10.

The automatic parking controller 100 may perform the automatic parking of the vehicle based on the data on the regions around the vehicle. The automatic parking controller 100 may generate information for the automatic parking based on the data on the regions around the vehicle.

In addition, the automatic parking controller 100 may control the vehicle 10 by acquiring control rights for the overall components (e.g., the sensor device 200, the vehicle speed controller 400, and the like) of the vehicle 10 during the automatic parking.

The automatic parking controller 100 may generate a control signal for the side mirror 310 during the automatic parking. The control signal for the side mirror 310 may include a folding signal and an unfolding signal for the side mirror.

The automatic parking controller 100 may generate the folding signal or the unfolding signal for the side mirror based on the data on the regions around the vehicle collected by the sensor device 200, and transmit the generated signal to the door unit 300. In addition, the automatic parking controller 100 may store a generation record of the folding signal or the unfolding signal in the memory (not shown).

The automatic parking controller 100 may receive an unfolding request for the side mirror 310 from the external device 20.

The unfolding request for the side mirror 310 received from the external device 20 may be a request included in the starting request and the un-lock request for the vehicle. The automatic parking controller 100 may determine whether to permit the side mirror unfolding request based on the side mirror unfolding request received from the external device 20, the generation record of the folding signal for the side mirror, and the data on the regions around the vehicle collected through the sensor device 200.

The automatic parking controller 100 may assist the user to easily board the vehicle 10 by determining whether to permit the side mirror unfolding request received from the external device 20.

The sensor device 200 may collect the data on the regions around the vehicle 10. The data on the regions around the vehicle 10 may be data that is a basis of the information for performing the automatic parking. In other words, the automatic parking controller 100 may generate the information for performing the automatic parking based on the data collected by the sensor device 200.

The sensor device 200 may include a distance measurement sensor (e.g., an ultrasonic sensor and the like), an image sensor (e.g., an omnidirectional camera and the like), an acceleration sensor, a yaw rate sensor, a wheel speed sensor, a steering angle sensor, a distance sensor, and the like to collect the data on the regions around the vehicle 10.

For example, the ultrasonic sensor included in the sensor device 200 may collect data on a location, a size, a shape, and the like of an object in the regions around the vehicle 10 based on a detection time of an ultrasonic wave. In addition, in the case of the omnidirectional camera, image data for the regions around the vehicle 10 may be collected.

The automatic parking controller 100 may generate the information required for performing the automatic parking based on the data collected by the sensor device 200.

The information required to perform the automatic parking may include information (e.g., a width of a parking space, an obstacle located around the parking space, a distance from the vehicle 10 to the parking space, and the like) on the parking space for parking the vehicle 10, information (e.g., other vehicles and pedestrians around, user locations, terrain features, or the like) on an obstacle adjacent to a parking location or a parking route, and road surface information (e.g., a resistance of a road surface, a material of the road surface, and the like) of the parking route, and the like, as an example.

In addition, the information required for performing the automatic parking may include information on a user's location. The information on the location of the user may be collected by the distance measurement sensor (e.g., the ultrasonic sensor) described above.

The door unit 300 may control the component (e.g., the side mirror 310, the door locking device, a door glass, a side airbag, and the like) included in the door of the vehicle 10.

When performing the automatic parking, the automatic parking controller 100 may acquire control rights for the door unit 300. When the control rights for the door unit 300 are acquired, the automatic parking controller 100 may generate a control signal for the door unit 300 and transmit the generated control signal to the door unit 300.

According to an embodiment of the present disclosure, when performing the automatic parking, the automatic parking controller 100 may generate the folding signal and the unfolding signal for the side mirror and transmit the folding signal and the unfolding signal to the door unit 300. The door unit 300 may control the side mirror 310 based on the received control signal.

The vehicle speed controller 400 may be a component that controls the behavior of the vehicle 10. The behavior of the vehicle 10 may collectively refer to stopping and moving of the vehicle 10 such as braking, driving, steering, shift, and the like of the vehicle 10.

The automatic parking controller 100 acquires the control rights of the vehicle speed controller 400 based on a user input, so that even when the user does not directly control the vehicle 10, parking or unparking of the vehicle may be performed by the automatic parking controller 100.

The vehicle speed controller 400 may include a steering controller (not shown) that controls a steering device to adjust a direction of the vehicle 10, a shift controller (not shown) that controls a shift device to control the shift of the vehicle 10, a driving controller (not shown) that controls a driving device to control a driving torque of the vehicle 10, and a braking controller (not shown) that controls a braking device to control the braking of the vehicle 10.

The steering device may include a steering wheel as an example. The shift device may include a transmission as an example. The driving device may include an engine, a motor, or the like. The braking device may include a brake.

Each controller is a general in-vehicle device for performing the parking of the vehicle 10, so that a detailed description thereof will be omitted.

The communication device (not shown) may refer to a hardware device implemented with various electronic circuits to transmit and receive signals through wireless or wired connection.

The automatic parking controller 100 according to an embodiment of the present disclosure may perform wireless communication with the external device 20 through the communication device (not shown).

The wireless communication between the external device 20 and the vehicle 10 may be implemented using wireless Internet technologies such as a wireless LAN (WLAN) (WiFi), a wireless broadband (Wibro), and/or a world interoperability for microwave access (Wimax), short-range communication technologies such as a Bluetooth, a near field communication (NFC), a radio frequency identification (RFID), a RF communication, and/or a low frequency (LF) communication, and/or mobile communication technologies such as a code division multiple access (CDMA), a global system for mobile communication (GSM), a long term evolution (LTE), and/or LTE-Advanced, and the like as an example.

Figure 2:
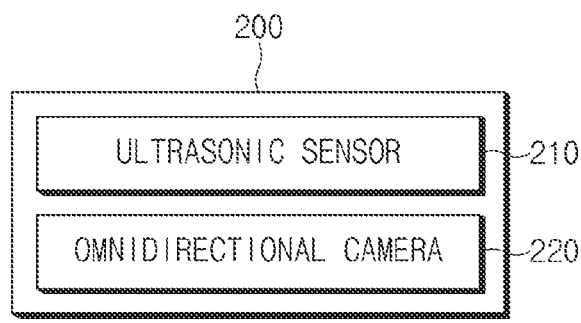
FIG. 2 illustrates a configuration of a sensor device according to an embodiment of the present disclosure.

FIG. 2 illustrates a configuration of the sensor device 200 according to an embodiment of the present disclosure.

According to an embodiment of the present disclosure, the sensor device 200 may include an ultrasonic sensor 210 and an omnidirectional camera 220.

The ultrasonic sensor 210 is a device that collects the data on the regions around the vehicle 10 using a sound wave, which may output an ultrasonic pulse and receive the ultrasonic pulse reflected from a surrounding object to collect the data on the regions around the vehicle 10.

Data corresponding to the region ahead of the vehicle and the region at the rear of the vehicle collected by the ultrasonic sensor 210 may be referred to as first data.

The omnidirectional camera 220 may be a device that collects the image data for the regions around the vehicle 10. The omnidirectional camera 220 may collect data corresponding to the region ahead of the vehicle 10, the region at the rear of the vehicle 10, a region on a left side of the vehicle 10, and a region on a right side of the vehicle 10 as images.

The data corresponding to the region ahead of the vehicle 10, the region at the rear of the vehicle 10, the region on the left side of the vehicle 10, and the region on the right side of the vehicle 10 collected by the omnidirectional camera 220 may be referred to as second data.

The automatic parking controller 100 may generate the information on the parking space, the information on the surrounding object, and the information on the user location from the first data collected by the ultrasonic sensor 210. In addition, the automatic parking controller 100 may generate the information on the parking space, the information on the surrounding object, and the information on the user location from the second data collected by the omnidirectional camera 220.

The automatic parking controller 100 may prevent a collision of the side mirror 310 by utilizing both the first data collected by the ultrasonic sensor 210 and the second data collected by the omnidirectional camera 220.

The ultrasonic sensor 210 and the omnidirectional camera 220 may have different data collection schemes and data collection regions. For example, because the ultrasonic sensor 210 collects the data using the sound wave, a data collection speed of the ultrasonic sensor 210 may be faster than that of the omnidirectional camera 220 that collects light and converts the light into an image.

In addition, because the ultrasonic sensor 210 and the omnidirectional camera 220 are arranged at different locations in the vehicle 10, a region corresponding to the first data may be different from a region corresponding to the second data. A difference between specific collection regions will be described with reference to FIG. 3.

Figure 3:
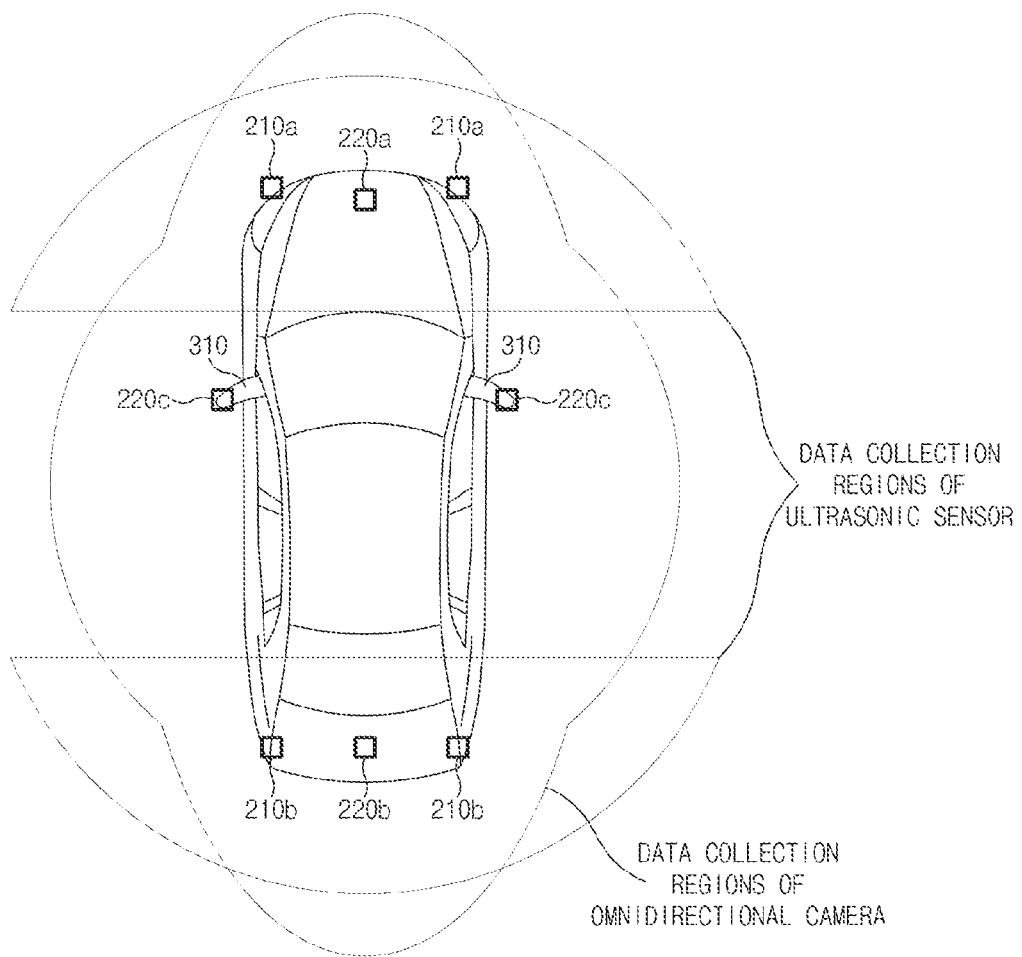
FIG. 3 exemplarily illustrates regions in which ultrasonic sensors and and omnidirectional cameras collect data.

FIG. 3 exemplarily illustrates regions in which ultrasonic sensors 210a and 210b and omnidirectional cameras 220a, 220b, and 220c collect data.

The vehicle 10 may include the ultrasonic sensors 210a and 210b and the omnidirectional cameras 220a, 220b, and 220c, as described above.

The ultrasonic sensors 210a and 210b and the omnidirectional cameras 220a, 220b, and 220c may be included in the sensor device 200 as described in FIG. 2.

According to an embodiment of the present disclosure, the vehicle 10 may include the front ultrasonic sensor 210a and the rear ultrasonic sensor 210b.

According to an embodiment, the front ultrasonic sensor 210a may be located in a front bumper of the vehicle 10, and the rear ultrasonic sensor 210b may be located in a rear bumper. The vehicle 10 may collect the first data, which is the data on the region ahead of the vehicle 10 and the region at the rear of the vehicle 10 through the ultrasonic sensors 210a and 210b.

In addition, according to an embodiment, the vehicle 10 may include the front camera 220a located in a front portion (e.g., a radiator grill) of the vehicle 10, the rear camera 220b located in a rear portion (e.g., a rear trunk) of the vehicle 10, and the side camera 220c located on the side mirror 310. The front camera 220a, the rear camera 220b, and the side camera 220c may be included in the omnidirectional camera 220.

The vehicle 10 may collect the second data, which is the data on the region ahead of the vehicle 10, the region at the rear of the vehicle 10, and the lateral region of the vehicle 10 through the omnidirectional cameras 220a, 220b, and 220c.

The ultrasonic sensors 210a and 210b may have a time it takes to collect the first data shorter than a time it takes to collect the second data of the omnidirectional cameras 220a, 220b, and 220c. In addition, the ultrasonic sensors 210a and 210b and the omnidirectional camera 220a, 220b, and 220c may be different from each other in regions for collecting the data on the regions around the vehicle 10. In other words, the ultrasonic sensors 210a and 210b and the omnidirectional cameras 220a, 220b, and 220c may collect the data complementarily.

Because the ultrasonic sensors 210a and 210b are respectively located in the front bumper and the rear bumper of the vehicle 10, in the data collection region of the ultrasonic sensors 210a and 210b, a blind spot may occur with respect to the lateral region of the vehicle 10. The first data corresponding to the data collection regions of the ultrasonic sensors 210a and 210b may not include data on the blind spot.

On the other hand, in the data collection regions of the omnidirectional cameras 220a, 220b, and 220c, the blind spot with respect to the lateral region of the vehicle 10 may not occur. The second data collected by the omnidirectional cameras 220a, 220b, and 220c may include the data corresponding to the blind spot of the ultrasonic sensors 210a and 210b.

However, according to an embodiment of the present disclosure, when the side mirror 310 is folded, the data collection by the side camera 220c may not be easy.

Therefore, the automatic parking controller 100 controls the side mirror 310 to be maintained in an unfolded state during the automatic parking, so that the omnidirectional cameras 220a, 220b, and 220c may compensate for the blind spot of the ultrasonic sensors 210a and 210b.

Figure 4:
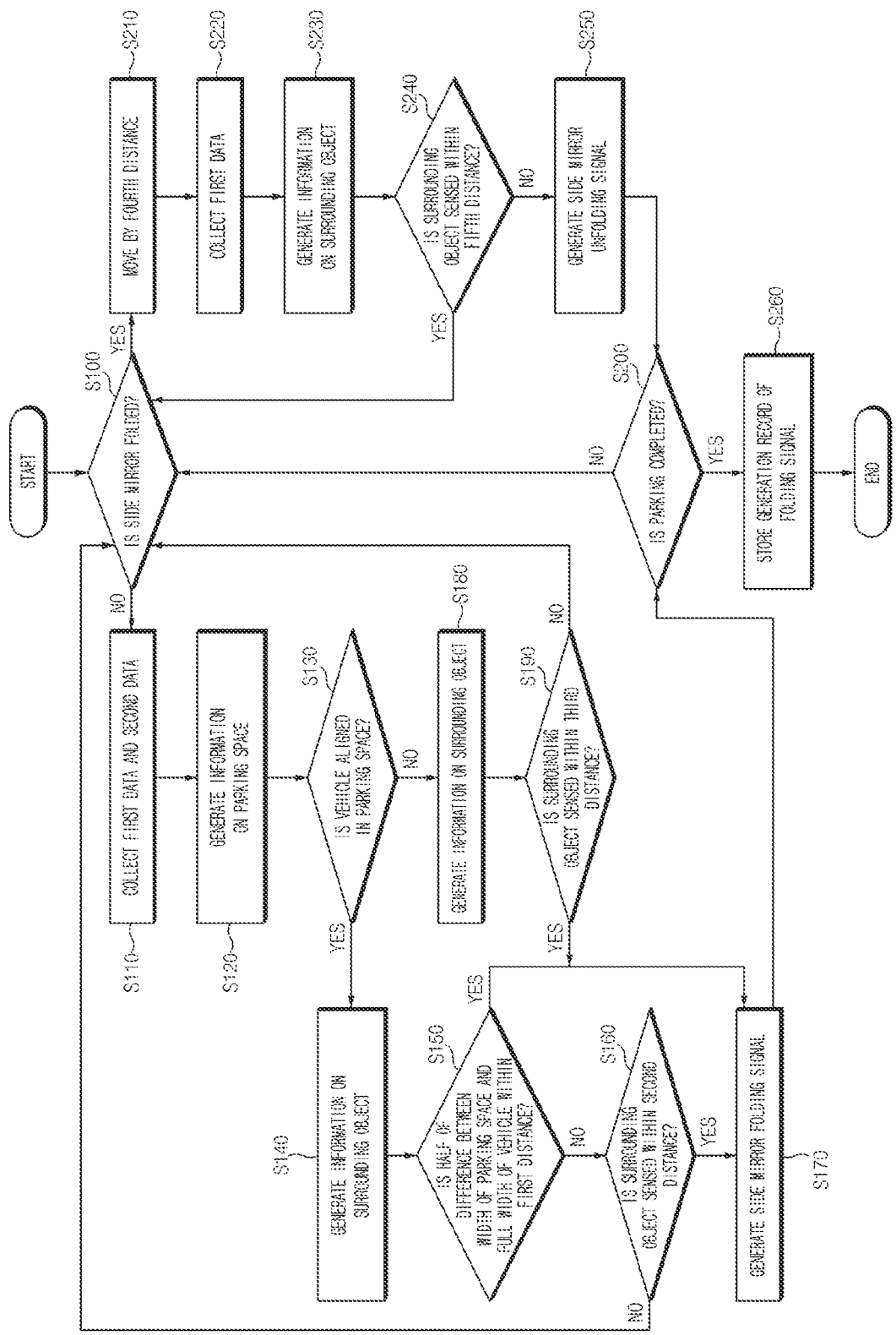
FIG. 4 is a flowchart illustrating an operation method of the vehicle when performing an automatic parking function according to an embodiment of the present disclosure.

FIG. 4 is a flowchart illustrating an operation method of the vehicle 10 when performing an automatic parking function according to an embodiment of the present disclosure.

Figure 5:
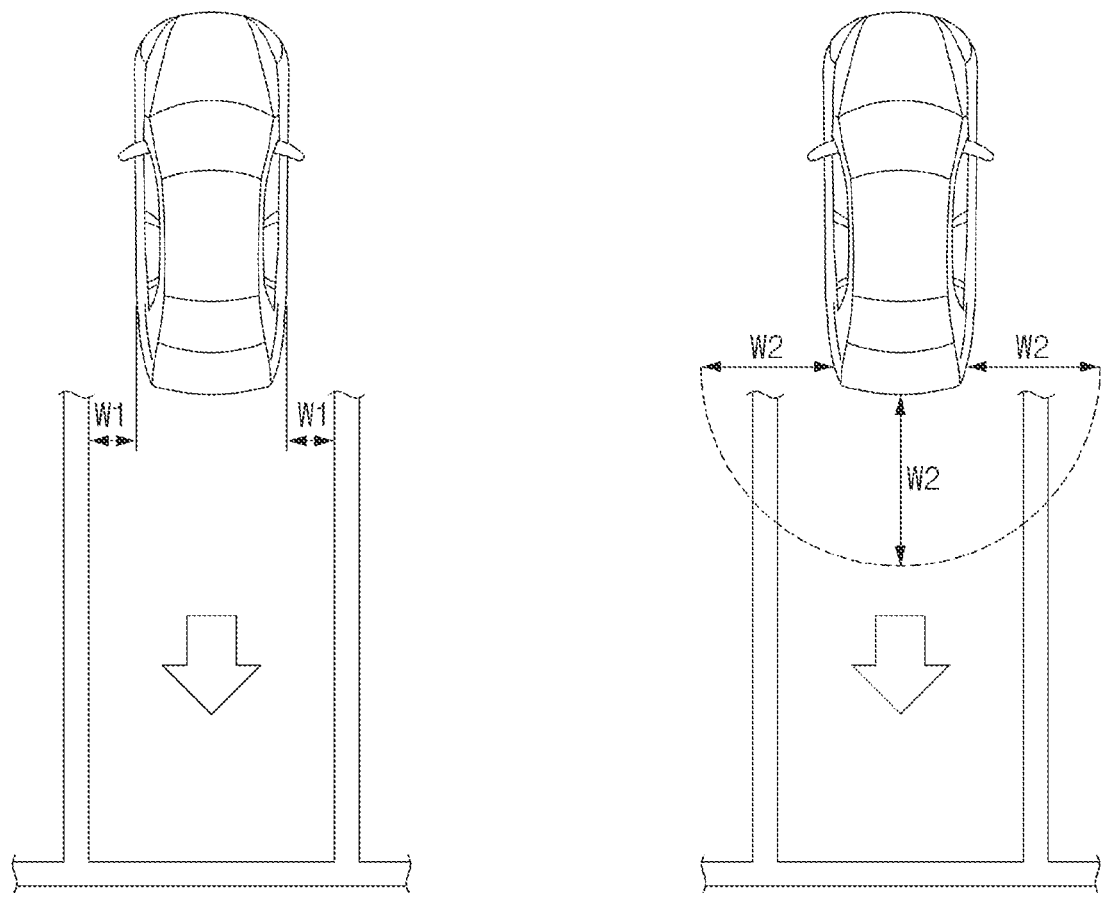
FIGS. 5 and 6 are diagrams for illustrating a method for generating a side mirror folding signal when the vehicle according to an embodiment of the present disclosure is aligned in a parking space.
Figure 6:
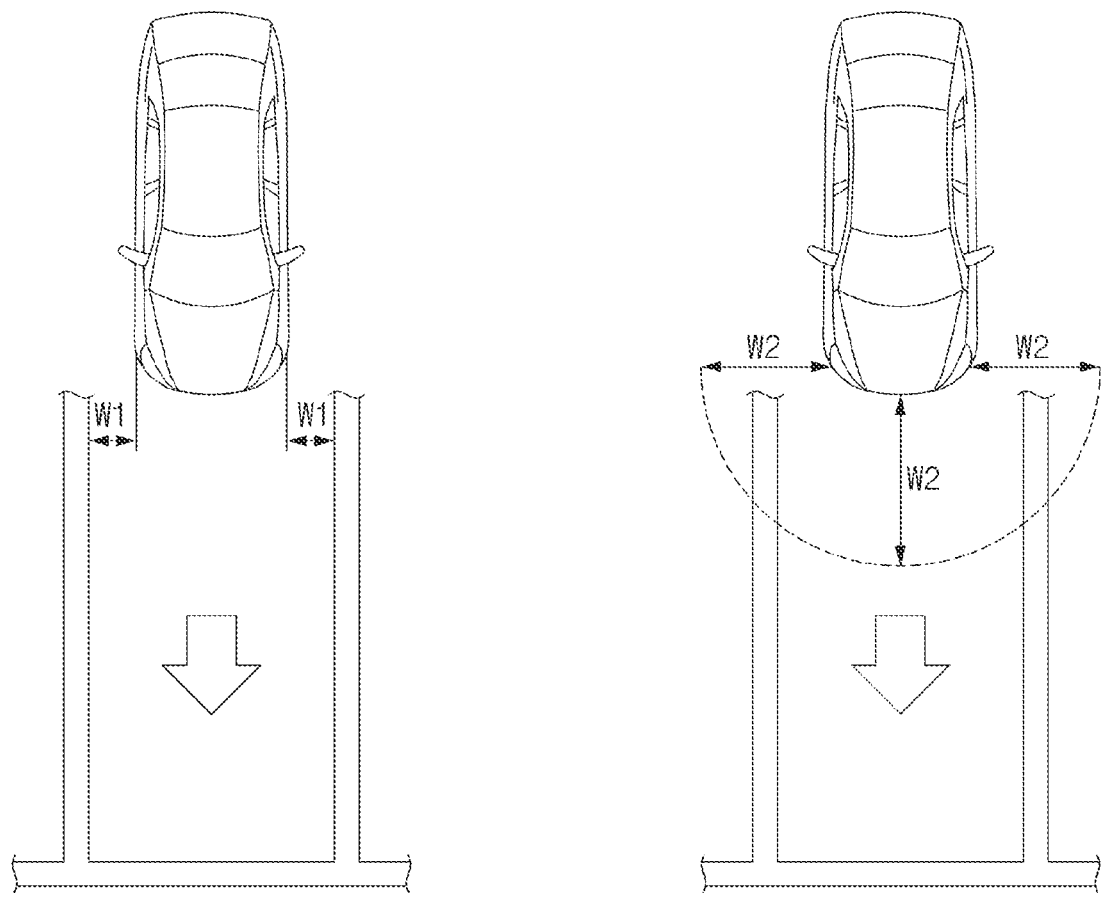

FIGS. 5 and 6 are diagrams for illustrating a method for generating a side mirror folding signal when the vehicle 10 according to an embodiment of the present disclosure is aligned in a parking space.

Figure 7:
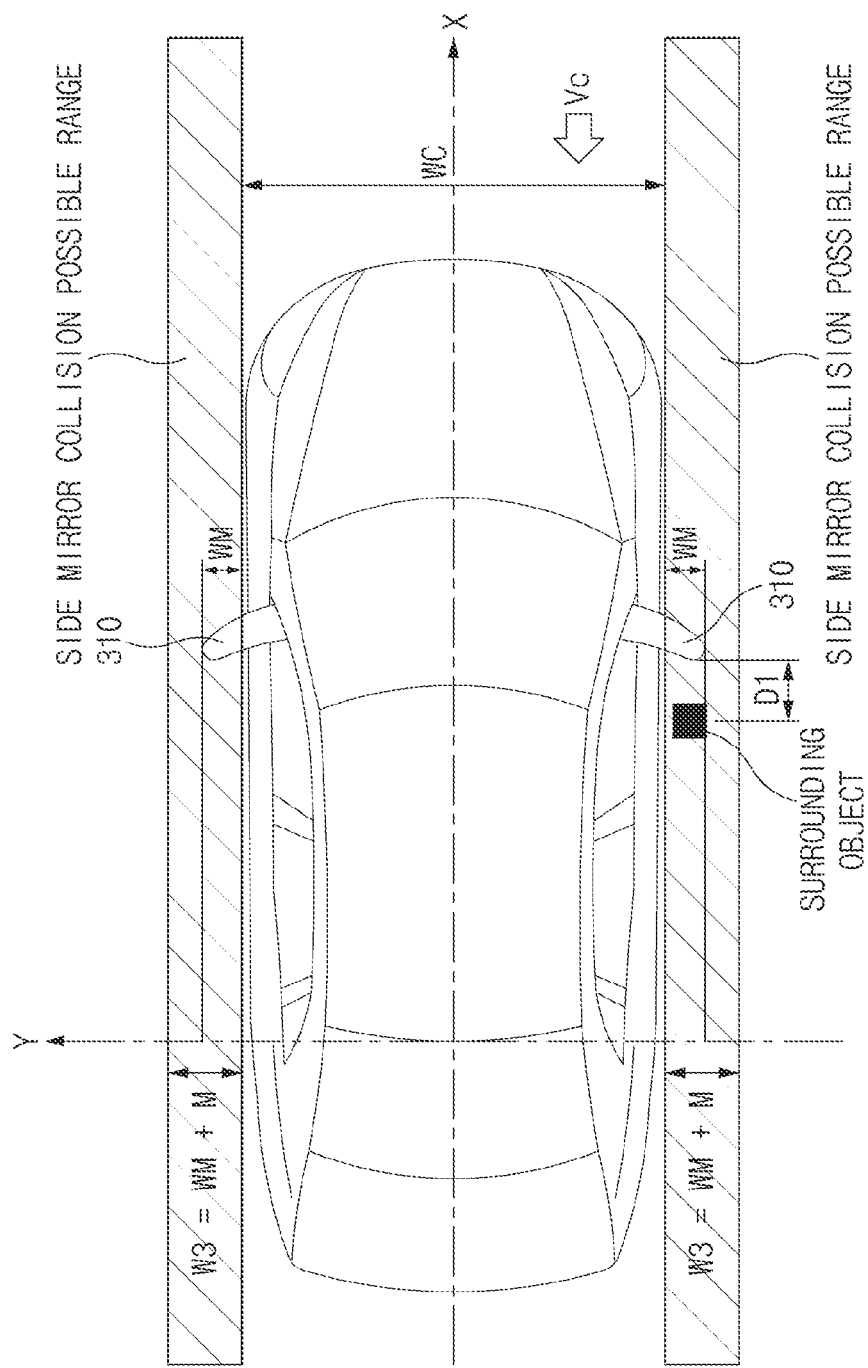
FIG. 7 is a diagram for illustrating a method for generating the side mirror folding signal when the vehicle according to an embodiment of the present disclosure is not aligned in the parking space.

FIG. 7 is a diagram for illustrating a method for generating the side mirror folding signal when the vehicle 10 according to an embodiment of the present disclosure is not aligned in the parking space.

Figure 8:
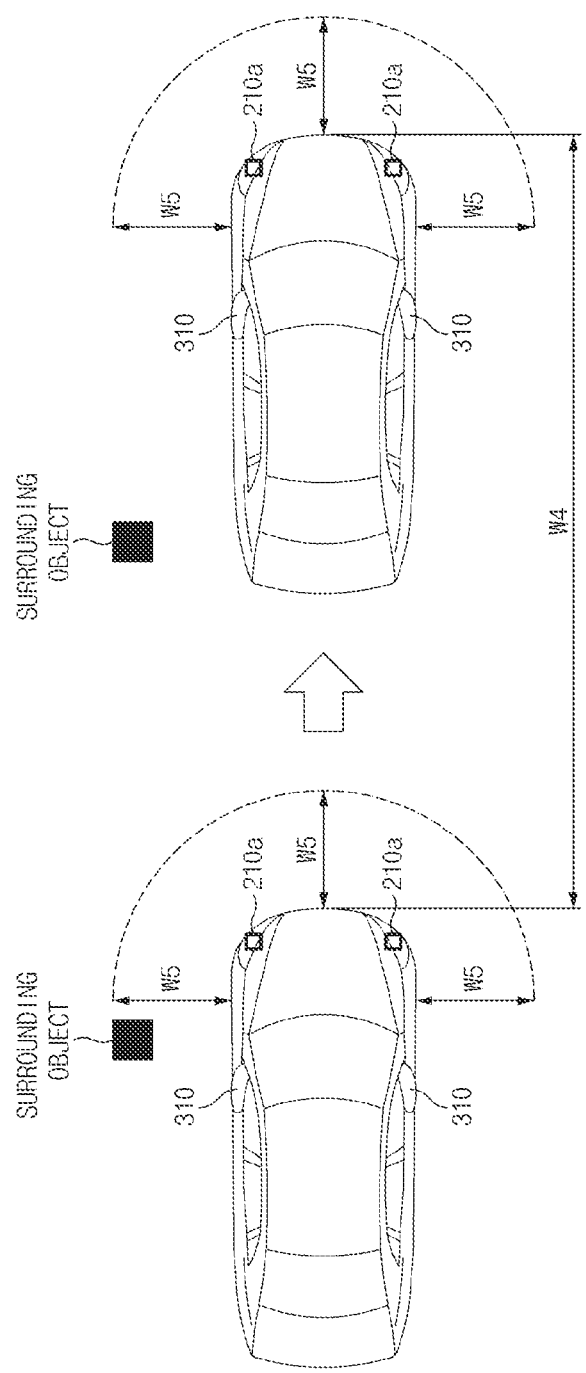
FIGS. 8 and 9 are diagrams for illustrating a method for generating the side mirror unfolding signal by the vehicle according to an embodiment of the present disclosure.
Figure 9:
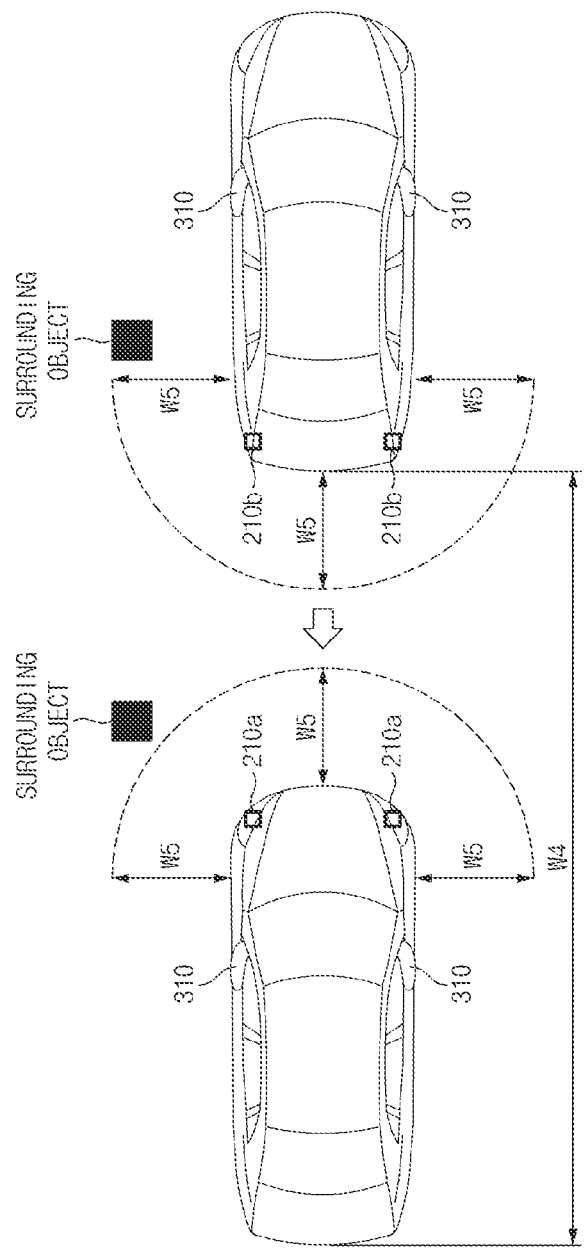

FIGS. 8 and 9 are diagrams for illustrating a method for generating the side mirror unfolding signal by the vehicle 10 according to an embodiment of the present disclosure.

First, referring to FIG. 4, the automatic parking controller 100 may determine whether the side mirror 310 is folded when performing the automatic parking (S100).

When the side mirror 310 is not folded (a NO path of S100), the sensor device 200 may collect the first data through the ultrasonic sensor 210 and collect the second data through the omnidirectional camera 220 (S110).

The automatic parking controller 100 may generate the information on the parking space through the collected first data and second data (S120).

The information on the parking space may be information including the width of the parking space, a location of the parking space, and a shape of the parking space (e.g., whether the parking space is for right angle parking or diagonal parking and the like).

The automatic parking controller 100 may determine whether the vehicle 10 is aligned in the parking space through the information on the generated parking space (S130).

When the vehicle 10 enters the parking space only with a forward movement or a backward movement, the automatic parking controller 100 may determine that the vehicle 10 is aligned in the parking space.

For example, as shown in FIGS. 5 and 6, when the vehicle may enter the parking space through the forward movement or the backward movement, the automatic parking controller 100 may determine that the vehicle 10 is aligned in the parking space.

When the vehicle 10 is aligned in the parking space, the automatic parking controller 100 may generate the information on the surrounding object based on the first data and the second data (S140).

The information on the surrounding object may refer to information on an object located on a route in which the vehicle 10 performs the automatic parking. However, when the vehicle 10 is aligned in the parking space, the information on the surrounding object may refer to information on an object adjacent to the parking space and the vehicle 10.

The automatic parking controller 100 may determine whether a half of a difference between the width of the parking space and a full width of the vehicle is within a first distance (S150).

When the half of the difference between the width of the parking space and the full width of the vehicle 10 is within a first distance W1 (a YES route of S150), the automatic parking controller 100 may generate the side mirror folding signal (S170).

When the half of the difference between the width of the parking space and the full width of the vehicle 10 is greater than the first distance W1 (a NO route of S150), the automatic parking controller 100 may determine whether the surrounding object is sensed within a second distance from the vehicle 10 (S160).

When the surrounding object is sensed within a second distance W2 from the vehicle 10 (a YES route of S160), the automatic parking controller 100 may generate the side mirror folding signal (S170).

When the half of the difference between the width of the parking space and the full width of the vehicle 10 is greater than the first distance W1 and when the surrounding object is not sensed within the second distance from the vehicle 10, the automatic parking controller 100 may return to the operation (S100) of determining the folding of the side mirror (a NO path of S160).

A method for generating the folding signal of the side mirror 310 when the side mirror 310 is unfolded and when the vehicle 10 is aligned in the parking space will be described with reference to FIGS. 6 and 7.

When the automatic parking controller 100 determines whether the half of the difference between the width of the parking space and the full width of the vehicle 10 is within the first distance W1, the full width of the vehicle may refer to a horizontal distance of the widest portion of a horizontal width of the vehicle excluding the side mirrors 310.

When the half of the difference between the width of the parking space and the full width of the vehicle 10 is within the first distance W1, the automatic parking controller 100 may determine the parking space as a narrow parking space. When entering the narrow parking space, the collision of the side mirror 310 may be prevented by folding the side mirror 310.

The first distance W1 may vary depending on the shape of the parking space, a performance of the sensor device 200, a size of the side mirror 310, a time it takes for the folding of the side mirror 310, and the full width of the vehicle 10.

For example, in the case of the diagonal parking situation, the first distance W1 may be 40 centimeters. In addition, in the case of the right angle parking situation, the first distance W1 may be 30 centimeters.

Even when the half of the difference between the width of the parking space and the full width of the vehicle 10 is greater than the first distance W1, when the surrounding object is sensed within the second distance W2 from the vehicle 10, the automatic parking controller 100 may generate the side mirror folding signal.

The second distance W2 may vary depending on a driving environment of the vehicle 10, the performance of the sensor device 200, the size of the side mirror 310, the time it takes for the folding of the side mirror 310, and the full width of the vehicle 10.

For example, when a length of the side mirror 310 is 15 centimeters, the second distance W2 may be 55 centimeters. The second distance W2 may be determined in consideration of a time it takes for the sensor device 200 to sense the surrounding object and fold the side mirror 310, and the size of the side mirror 310.

In a case of reverse parking or reverse diagonal parking, the automatic parking controller 100 may determine the distance between the surrounding object and the vehicle 10 based on the data collected by the rear ultrasonic sensor 210*b* or the rear camera 220*b*.

In a case of forward parking or forward diagonal parking, the automatic parking controller 100 may determine the distance between the surrounding object and the vehicle 10 based on the data collected by the front ultrasonic sensor 210*a* or the front camera 220*a*.

Returning to operation (S130) in FIG. 4, when the vehicle 10 is not aligned in the parking space (a NO route of S130), the automatic parking controller 100 may generate the information on the surrounding object based on the first data and the second data (S180).

The automatic parking controller 100 may determine whether the surrounding object is sensed within a third distance from the vehicle 10 through the generated information on the surrounding object (S190).

When the surrounding object is sensed within the third distance from the vehicle 10, the automatic parking controller 100 may determine that there is a possibility of collision with the side mirror 310 and generate the side mirror folding signal (S170).

When the surrounding object is not sensed within the third distance from the vehicle 10 (a NO path of S190), the automatic parking controller 100 may return to the side mirror folding operation (S100). A method for sensing the surrounding object by the automatic parking controller 100 and a specific method for generating the folding signal will be described with reference to FIG. 7.

A method for detecting the surrounding object within a third distance W3 from the vehicle 10 and the method for generating the folding signal are described with reference to FIG. 7.

The automatic parking controller 100 may generate information on the surrounding object within the third distance W3 from the vehicle 10 based on the first data collected by the ultrasonic sensor 210 and the second data collected by the omnidirectional camera 220.

As described above in FIG. 4, because the blind spot may be in the lateral region of the vehicle 10, the ultrasonic sensor 210 may compensate for the first data with the second data collected by the omnidirectional camera 220 when the side mirror 310 is unfolded.

The automatic parking controller 100 may generate information on the surrounding object in a sensing region of the ultrasonic sensor 210 from the vehicle 10 based on the first data.

In addition, the automatic parking controller 100 may collect the image data (the second data) for the region ahead of the vehicle 10, the region at the rear of the vehicle 10, and the lateral region of the vehicle 10 collected by the omnidirectional camera 220 to generate an omnidirectional image.

The automatic parking controller 100 may generate the information on the surrounding object by analyzing a region occupied by the vehicle 10 and a region occupied by the surrounding object of the generated omnidirectional image in pixel units.

The automatic parking controller 100 may calculate an actual distance between the surrounding object and the vehicle 10 and the size of the surrounding object from a unit pixel through data on the total width and a total length (the largest value among front-rear lengths of the vehicle) of the vehicle.

The automatic parking controller 100 may introduce a coordinate system to the omnidirectional image to sense the surrounding object that may collide with the vehicle 10.

For example, the vehicle 10 may have an extension line of a rear wheel axle as a Y-axis, and an extension line bisecting the rear wheel axle as an X-axis.

With respect to the X-Y coordinate system, the automatic parking controller 100 may sense the surrounding object within the third distance W3 from the X-axis as an object with a possibility of collision. The third distance W3 may be a value obtained by adding a protruding width WM of when the side mirror 310 is unfolded and a margin width M to a half value of a full width WC of the vehicle 10. According to an embodiment, when the side mirror 310 is unfolded, the protruding width WM may be 15 centimeters, and the margin width M may be 5 centimeters.

When the surrounding object is sensed within the third distance W3 from the vehicle 10, the automatic parking controller 100 may generate the folding signal based on a current vehicle speed Vc of the vehicle 10, a distance Di between the surrounding object and the side mirror 310, and a time it takes to complete the folding of the side mirror 310, and control a speed of the vehicle 10.

The vehicle 10 moving backward at the current vehicle speed Vc is shown through FIG. 7. When the vehicle 10 continues to move, the surrounding object and the side mirror 310 may collide with each other.

The automatic parking controller 100 may calculate a minimum folding distance based on the current vehicle speed Vc, the distance Di between the surrounding object and the side mirror 310, and the time it takes to complete the folding of the side mirror.

The minimum folding distance may refer to a distance capable of preventing the collision between the side mirror 310 and the surrounding object by folding the side mirror 310.

The minimum folding distance may be a value adding the margin distance to a value obtained by multiplying the current vehicle speed (centimeters/second) by the time it takes to complete the folding of the side mirror.

minimum folding distance=(current vehicle speed*time it takes to complete folding of side mirror)+margin distance The margin distance may be 10 centimeters as an example.

According to an embodiment, while the vehicle 10 is moving, the collision between the side mirror 310 and the surrounding object may not occur through a change in the steering angle. Accordingly, the automatic parking controller 100 may generate the folding signal based on the minimum folding distance, the distance Di between the surrounding object and the side mirror 310, and the change in the steering angle of the vehicle 10.

For example, when the minimum folding distance is smaller than the distance Di between the surrounding object and the side mirror 310, and when the surrounding object is not avoidable based on the change in the steering angle while the vehicle 10 moves a preset distance from the minimum folding distance, the automatic parking controller 100 may generate the folding signal.

When the distance Di between the surrounding object and the side mirror 310 is smaller than the minimum folding distance, the automatic parking controller 100 may control the current speed Vc of the vehicle 10 based on the time it takes to complete the folding of the side mirror 310.

To secure the time it takes for the folding of the side mirror 310, the automatic parking controller 100 may control the speed of the vehicle 10 to be equal to or below a value obtained by dividing the distance Di between the surrounding object and the side mirror 310 by the time it takes to complete the folding of the side mirror.

$$\text{speed of vehicle} \leq \frac{\text{distance } D1 \text{ between the surrounding object and the side mirror}}{\text{time it takes to complete folding of side mirror}}$$

Returning to FIG. 4, when the automatic parking controller 100 generates the folding signal for the side mirror 310 (after S170), the automatic parking controller 100 may determine whether the parking is completed (S200).

When the parking is not completed (a NO path of S200), the automatic parking controller 100 may return to the operation (S100) of determining whether the side mirror is folded again. When the parking is completed (a YES path of S200), the automatic parking controller 100 may store the generation record of the folding signal in the memory (S260), and then, the determination process may be terminated.

In operation (S100), when the side mirror 310 is folded, the automatic parking controller 100 may move the vehicle 10 by a fourth distance (S210).

After the vehicle 10 moves by the fourth distance, the automatic parking controller 100 may collect the first data through the ultrasonic sensor 210 (S220).

The automatic parking controller 100 may generate the information on the surrounding object based on the first data (S230).

According to an embodiment, when the side mirror 310 is folded, the side camera 220c included in the omnidirectional camera 220 may not be able to collect information corresponding to the lateral region of the vehicle 10. Therefore, when the side mirror 310 is folded, the automatic parking controller 100 may generate the information on the surrounding object based on the first data collected by the ultrasonic sensor 210.

The first data may not include data on a portion (the blind spot region of the ultrasonic sensor 210) of the lateral region of the vehicle 10.

Therefore, the automatic parking controller 100 may move the vehicle 10 by the fourth distance to prevent a collision with the object located in the blind spot of the ultrasonic sensor 210.

The fourth distance may be set based on the performance of the sensor device 200. As an example, the fourth distance may be set based on a width of the blind spot of the ultrasonic sensor 210.

After moving the vehicle by the fourth distance, the automatic parking controller 100 may determine whether the surrounding object is sensed within a fifth distance from the vehicle 10 at the moved location (S240).

When the surrounding object is not sensed within the fifth distance from the vehicle 10 (a NO path of S240), the automatic parking controller 100 may generate the unfolding signal for the side mirror 310 (S250).

When the surrounding object is sensed within the fifth distance (a YES path in S230), the automatic parking controller 100 may determine that there is the possibility of collision between the side mirror 310 and the surrounding object, and return to operation (S100) of determining whether the side mirror is folded.

When the surrounding object is not sensed within the fifth distance, and when the side mirror 310 is folded, the automatic parking controller 100 may move the vehicle 10 by the fourth distance again.

After generating the unfolding signal for the side mirror 310, the automatic parking controller 100 may determine whether the automatic parking is completed (S200).

When the unfolding signal for the side mirror 310 is generated at the time of the termination of the automatic parking, the automatic parking controller 100 may store the generation record of the unfolding signal.

Hereinafter, a method for sensing the surrounding object and a method for generating the unfolding signal for the side mirror 310 by the automatic parking controller 100 when the side mirror 310 is folded will be described with reference to FIGS. 8 and 9.

FIG. 8 illustrates a situation in which the vehicle 10 moves forward when the side mirror 310 is folded.

When the side mirror 310 is folded, the automatic parking controller 100 may generate the information on the surrounding object based on the first data collected by the ultrasonic sensor 210.

The automatic parking controller 100 may sense the surrounding object based on the generated information on the surrounding object. When the vehicle 10 moves forward, the automatic parking controller 100 may generate the information on the surrounding object based on the first data collected by the front ultrasonic sensor 210*a*.

When the surrounding object is sensed within a fifth distance W5 from the vehicle 10 based on the information on the surrounding object, the automatic parking controller 100 may move the vehicle 10 forward by a fourth distance W4 from a point at which the surrounding object is not sensed.

When the vehicle 10 moves forward, the automatic parking controller 100 may collect the first data through the front ultrasonic sensor 210*a* at the location moved by the fourth distance W4.

The automatic parking controller 100 may generate the information on the surrounding object based on the collected first data. When the surrounding object is not sensed within the fifth distance from the vehicle based on the generated information on the surrounding object, the automatic parking controller 100 may generate the unfolding signal for the side mirror 310.

The fourth distance W4 may be 50 centimeters as an example. The fourth distance W4 may be set based on the width of the blind spot where the data on the region around the vehicle 10 is not collected by the front ultrasonic sensor 210*a* or the rear ultrasonic sensor 210*b*. In another embodiment, the fourth distance W4 may be set based on a distance between the front ultrasonic sensor 210*a* and the rear ultrasonic sensor 210*b*.

The fifth distance W5 may be set based on the performance of the ultrasonic sensor 210, the size of the side mirror 310, an attachment location of the side mirror 310, and the like. FIG. 9 exemplarily illustrates a situation in which the vehicle 10 moves backward when the side mirror 310 is folded.

When the side mirror 310 is folded, the automatic parking controller 100 may generate the information on the surrounding object based on the first data collected by the ultrasonic sensor 210.

When the vehicle 10 moves backward, the first data collected by the front ultrasonic sensor 210*a* and the rear ultrasonic sensor 210*b* may be utilized.

The automatic parking controller 100 may generate the information on the surrounding object based on the first data collected by the rear ultrasonic sensor 210*b*.

The automatic parking controller 100 may sense whether there is the surrounding object within the fifth distance W5 from the vehicle 10 based on the generated information on the surrounding object.

When the surrounding object is sensed within the fifth distance W5 from the vehicle 10, the automatic parking controller 100 may move the vehicle 10 backward by the fourth distance W4 from the point at which the surrounding object is not sensed.

When the vehicle 10 moves backward, the automatic parking controller 100 may collect the first data again through the front ultrasonic sensor 210*a* at the location moved by the fourth distance W4.

Because the side mirror 310 is generally located in the front portion of the vehicle 10, when the vehicle 10 moves backward, the vehicle 10 may utilize both the rear ultrasonic sensor 210*b* and the front ultrasonic sensor 210*a*.

When the surrounding object is not sensed through the collected first data, the automatic parking controller 100 may generate the unfolding signal for the side mirror 310.

The fourth distance W4 may be 50 centimeters as an example. The fourth distance W4 may be set based on the width of the blind spot where the data on the region around the vehicle 10 is not collected by the front ultrasonic sensor 210*a* or the rear ultrasonic sensor 210*b*. In another embodiment, the fourth distance W4 may be set based on the distance between the front ultrasonic sensor 210*a* and the rear ultrasonic sensor 210*b*.

The fifth distance W5 may be set based on the performance of the ultrasonic sensor 210, the size of the side mirror 310, the attachment location of the side mirror 310, and the like.

Figure 10:
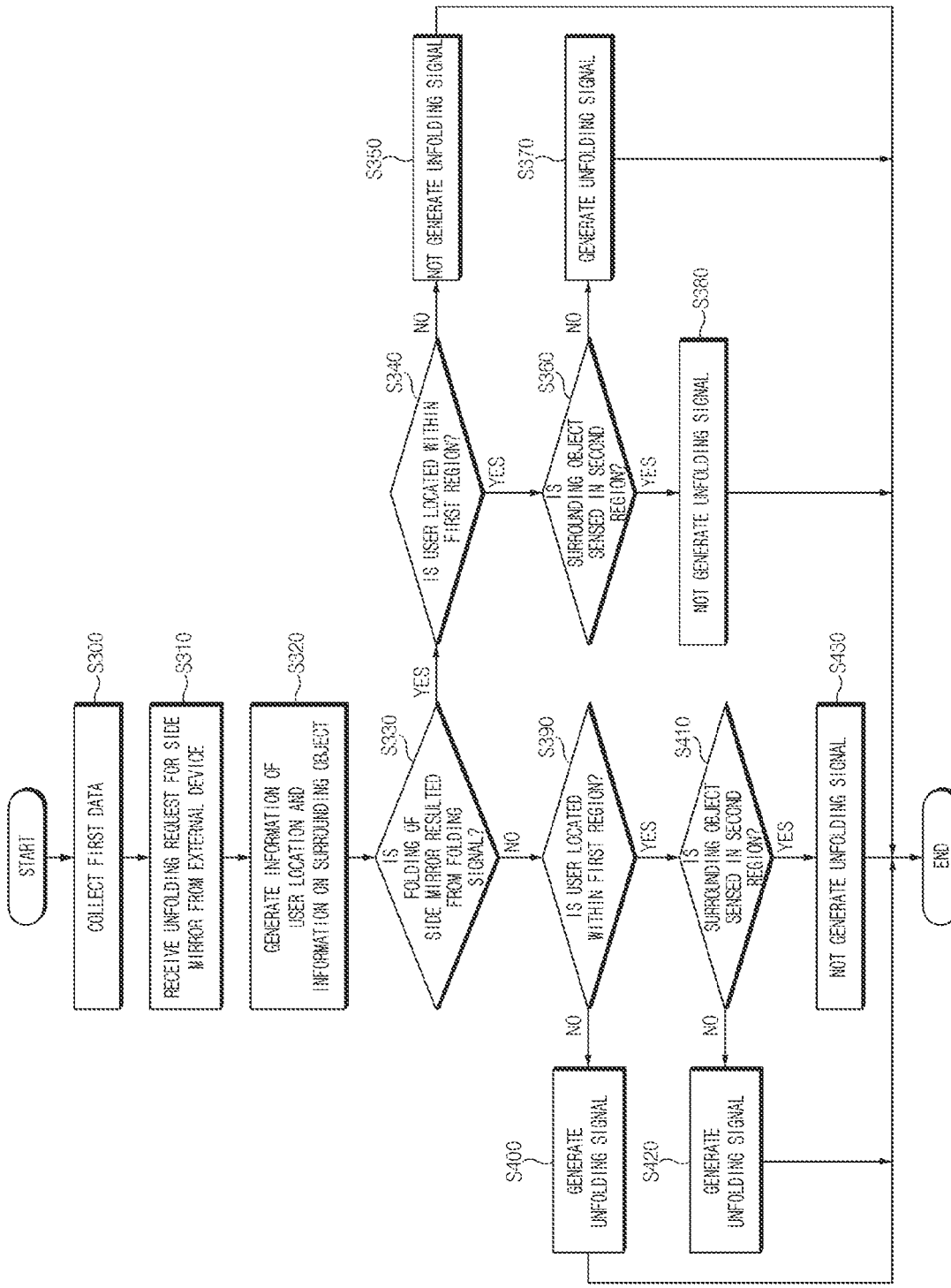
FIG. 10 is a flowchart for illustrating a method for unfolding a side mirror according to an embodiment of the present disclosure.

FIG. 10 is a view for illustrating a method for unfolding the side mirror 310 according to an embodiment of the present disclosure.

When the vehicle 10 is turned off or when the automatic parking is terminated after the parking by the automatic parking controller 100 is completed, the side mirror 310 may be folded.

In other words, when the vehicle 10 is stopped after completing the parking, the side mirror 310 may be in a folded state.

The automatic parking controller 100 may store the generation record of the folding signal for the side mirror 310 at the time of the termination of the automatic parking after the automatic parking is completed.

The automatic parking controller 100 stores the generation record of the folding signal for the side mirror 310 in the memory (not shown) when the automatic parking is terminated, thereby determining whether the folding of the side mirror 310 is resulted from the folding signal generated by the automatic parking controller 100.

The automatic parking controller 100 may determine whether to permit the external unfolding request for the side mirror 310 later based on the stored folding signal generation information.

When the side mirror is folded, the sensor device 200 may collect the first data through the ultrasonic sensor 210 (S300).

The automatic parking controller 100 may receive the unfolding request for the side mirror 310 from the external device 20 (S310).

As described above, the unfolding request for the side mirror 310 may be included in the un-lock signal for the vehicle 10 or a wake-up request for the vehicle 10.

The external device 20 is a device including the smart key and a digital key, which may communicate with the vehicle 10. In a following description, it is assumed that the external device 20 is the smart key.

The automatic parking controller 100 may generate the information of the user location and the information on the surrounding object based on the collected first data (S320).

The automatic parking controller 100 may sense whether the user is in a welcome region (the first region) or a vehicle-adjacent region (the second region) through the information of the user location.

In addition, the automatic parking controller 100 may sense whether there is the surrounding object in the adjacent region (the second region) through the information on the surrounding object.

When the user is located in the welcome region (the first region) and the vehicle 10 receives the signal from the external device 20, the vehicle 10 may perform a preset operation.

For example, when the vehicle 10 receives the un-lock request and the like from the external device 20, and when the user is located in the welcome region (the first region), the vehicle 10 may perform lighting of a lamp, the unfolding operation of the side mirror 310, and the like.

The adjacent region (the second region) may be a region within a preset distance from the vehicle 10, which may be a region with the possibility of collision with the vehicle 10. The adjacent region (the second region) may be determined based on the size of the side mirror 310, and may be, for example, a 40 cm region from an end of a full width of the vehicle 10. According to an embodiment, the welcome region (the first region) may be wider than the adjacent region (the second region). In other words, the adjacent region (the second region) may be included in the welcome region (the first region).

The automatic parking controller 100 may determine whether the folding of the side mirror 310 is resulted from the folding signal based on the generation record of the folding signal (S330).

When the generation record for the folding signal is stored at the time of the termination of the automatic parking (a YES path in S330), the automatic parking controller 100 may determine whether the user is located within the first region (S340).

When the automatic parking is terminated in the folded state of the side mirror 310, it may be a case that the surrounding object is sensed within a preset distance from the vehicle 10 or the parking space is narrow.

When the side mirror 310 is folded by the folding signal of the automatic parking controller 100, and when the user is not in the first region (a NO path in S340), the automatic parking controller 100 may ignore the unfolding request and may not generate the unfolding signal (S350).

When the user requests the unfolding from outside the first region, the user may not be aware of a situation around the vehicle 10. Therefore, the automatic parking controller 100 may prevent the collision of the side mirror 310 by ignoring the unfolding request.

When the side mirror 310 is folded by the folding signal of the automatic parking controller 100, and when the user is within the first region (a YES path in S340), the automatic parking controller 100 may determine whether the surrounding object is sensed in the second region (S360).

When the surrounding object is not sensed in the second region (a NO path in S360), the automatic parking controller 100 may generate the unfolding signal based on the unfolding request (S370).

When the user is in the first region and no surrounding object is sensed in the second region, the automatic parking controller 100 may determine that the user has been sufficiently aware of the situation around the vehicle 10. In addition, because the object that has the possibility of collision with the vehicle 10 is also not sensed, the automatic parking controller 100 may unfold the side mirror 310 by generating the unfolding signal.

When the surrounding object is sensed in the second region (a YES path of S360), because the surrounding object may be the user or the object with the possibility of collision, the automatic parking controller 100 may not generate the unfolding signal for the easy vehicle boarding of the user and for preventing the collision between the side mirror 310 and the surrounding object (S380).

When the generation record of the folding signal is not stored at the time of the termination of the automatic parking (a NO route of S330), the automatic parking controller 100 may determine whether the user is located in the first region (S390).

When the user is not within the first region (a NO path of S390), the automatic parking controller 100 may generate the unfolding signal based on the unfolding request (S400).

When the user is in the first region (a YES path in S390), the automatic parking controller 100 may determine whether the surrounding object is sensed in the second region (S410).

When the surrounding object is not sensed in the second region (a NO path in S410), the automatic parking controller 100 may generate the unfolding signal based on the unfolding request (S420).

When the user is in the first region and no surrounding object is sensed in the second region, the automatic parking controller 100 may determine that the user has been sufficiently aware of the situation around the vehicle 10. In addition, because the object that has the possibility of collision with the vehicle 10 is not sensed, the automatic parking controller 100 may generate the unfolding signal to unfold the side mirror 310.

When the surrounding object is sensed in the second region (a YES path of S410), the automatic parking controller 100 may ignore the unfolding request and may not generate the unfolding signal (S430).

When the surrounding object is sensed in the second region, because the surrounding object may be the user or the object with the possibility of collision, the automatic parking controller 100 may not generate the unfolding signal for the easy vehicle boarding of the user and for preventing the collision of the side mirror 310 (S430).

According to another embodiment of the present disclosure, after operation (S400) (when the automatic parking controller 100 does not store the information on the generation of the folding signal, and the user requests the unfolding from outside the first region), the automatic parking controller 100 may collect the first data again through the ultrasonic sensor 210.

The automatic parking controller 100 may generate the information on the user location based on the first data collected again. When the user moves into the second region, the automatic parking controller 100 may sense the user location in the second region and generate the folding signal for the side mirror 310.

When the user moves into the second region, the automatic parking controller 100 may determine that the user has an intention to board the vehicle 10, and fold the side mirror 310 for the easy vehicle boarding of the user and for preventing the collision between the side mirror 310 and the user.

FIG. 11 illustrates an unfolding request permission condition according to an embodiment of the present disclosure.

Referring to FIG. 11, whether the unfolding request is permitted depending on a folding cause of the side mirror 310 and the location of the user is illustrated.

The side mirror 310 may be folded by the folding signal generated by the automatic parking controller 100, or may be folded based on the turn-off of the vehicle 10.

Therefore, when the generation record of the folding signal is stored at the time of the termination of the automatic parking, and when the unfolding request is received from the external device, the automatic parking controller 100 may determine the folding cause of the side mirror 310 by determining whether the generation record of the folding signal is stored.

As described above, because the second region is included in the first region, the location of the user may be determined as one of three as shown in FIG. 11.

When the user is in the second region, the automatic parking controller 100 may ignore the unfolding request regardless of the folding signal generation record.

When the user is located in the second region as the region adjacent to the vehicle 10, the automatic parking controller 100 may assist the easy vehicle boarding of the user by ignoring the unfolding request for the side mirror 310.

When the user is located inside the first region and outside the second region, the automatic parking controller 100 may permit the unfolding request regardless of the folding signal generation record.

When the user is located inside the first region, the user may be sufficiently aware of the environment around the vehicle 10, and there is no risk of collision with the vehicle 10 by being located outside the second region, the automatic parking controller 100 may generate the unfolding signal for the side mirror 310.

When the user is located outside the first region, the automatic parking controller 100 may determine whether to permit the unfolding request based on whether the folding signal generation record is stored.

When the user is located outside the first region, and when the side mirror 310 is folded by the folding signal, the automatic parking controller 100 may determine that the user has not been sufficiently aware of the environment around the vehicle 10.

During the automatic parking of the vehicle 10, the side mirror 310 may be folded when the parking space is narrow or the surrounding object is sensed. Therefore, when the user is located outside the first region, and when the information on the generation of the folding signal is stored, the automatic parking controller 100 may ignore the unfolding request.

On the other hand, even when the user is located outside the first region, when the folding signal generation record is not stored (in a case of folding by other reasons), the unfolding request of the user may be permitted.

Hereinabove, although the embodiments of the present disclosure have been described with reference to the accompanying drawings, those of ordinary skill in the technical field to which the present disclosure belongs will be able to understand that the present disclosure may be implemented in other concrete forms without changing the technical idea or essential features. Therefore, it should be understood that the embodiments described above are illustrative in all respects and not limiting.

When the side mirror is unfolded, the vehicle proposed by embodiments of the present technology may collect the data on the regions around the vehicle through the ultrasonic sensor and the omnidirectional camera, and generate the folding signal for the side mirror based on the collected data and the folded state of the side mirror. Thus, the vehicle may compensate for the blind spot of the ultrasonic sensor and prevent the collision situation of the side mirror.

In addition, when collecting the unfolding request for the side mirror from the external device, the vehicle proposed by embodiments of the present technology may determine whether to unfold the side mirror based on the cause for the folding of the side mirror. Thus, a comfortable boarding environment may be provided to the user.

In addition, various effects that are directly or indirectly identified through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle comprising:
a sensor device configured to collect data on regions around the vehicle; and
an automatic parking controller configured to generate a folding signal or an unfolding signal for a side mirror based on the data collected by the sensor device and a state of the side mirror when performing automatic parking,
wherein the automatic parking controller is configured to calculate a minimum folding distance based on a current speed of the vehicle, a distance between a surrounding object and the vehicle, and a time needed to complete folding of the side mirror.

2. The vehicle of claim 1, wherein:
the sensor device includes front and rear ultrasonic sensors and omnidirectional cameras;
the front and rear ultrasonic sensors collect first data on a region ahead of the vehicle and a region behind the vehicle; and
the omnidirectional cameras collect second data on the region ahead of the vehicle, the region behind the vehicle, and a lateral region of the vehicle, wherein the omnidirectional cameras include:
a front camera located on a front surface of the vehicle;
a rear camera located on a rear surface of the vehicle; and
a side camera located on the side mirror.

3. The vehicle of claim 2, wherein, when the side mirror is unfolded, the automatic parking controller is configured to:
generate information on a parking space based on the first data and the second data; and
determine whether the vehicle is able to enter the parking space through forward movement or backward movement only.

4. The vehicle of claim 3, wherein, when the vehicle enters the parking space through the forward movement or the backward movement only, the automatic parking controller is configured to:
generate information on the surrounding object based on the first data and the second data; and
generate the folding signal when a half of a difference of a width of the parking space from a full width of the vehicle is within a first distance or when the surrounding object is sensed within a second distance from the vehicle.

5. The vehicle of claim 3, wherein, when the vehicle is not able to enter the parking space through the forward movement or the backward movement only, the automatic parking controller is configured to:
generate information on the surrounding object based on the first data and the second data; and
generate the folding signal when the surrounding object is sensed within a third distance from the vehicle.

6. The vehicle of claim 1, wherein the automatic parking controller is configured to generate the folding signal based on the minimum folding distance, the distance between the surrounding object and the vehicle, and a change in a steering angle of the vehicle.

7. The vehicle of claim 1, wherein, when the distance between the surrounding object and the vehicle is smaller than the minimum folding distance, the automatic parking controller is configured to control a speed of the vehicle based on the distance between the surrounding object and the vehicle and the time needed to complete the folding of the side mirror.

8. The vehicle of claim 2, wherein, when the side mirror is folded, the automatic parking controller is configured to move the vehicle by a fourth distance to a new location, and generate information on surrounding object based on the first data collected at the new location.

9. The vehicle of claim 8, wherein the automatic parking controller is configured to:
move the vehicle by the fourth distance again when the surrounding object is sensed within a fifth distance from the vehicle; and
generate the unfolding signal when the surrounding object is not sensed within the fifth distance from the new location.

10. The vehicle of claim 8, wherein the automatic parking controller is configured to generate the unfolding signal when the surrounding object is not sensed within a fifth distance from the vehicle.

11. The vehicle of claim 2, wherein the automatic parking controller is configured to:
store a generation record of the folding signal when the automatic parking is terminated; and
generate the unfolding signal based on the first data, the generation record, and an unfolding request when receiving the unfolding request for the side mirror from an external device.

12. The vehicle of claim 11, wherein the automatic parking controller is configured to:
generate information on a user location based on the first data; and
ignore the unfolding request and not generate the unfolding signal when the user location is outside a first region and when there is the generation record.

13. The vehicle of claim 11, wherein the automatic parking controller is configured to:
generate information on a user location based on the first data; and
permit the unfolding request and generate the unfolding signal when the user location is outside a first region and when there is no generation record.

14. The vehicle of claim 13, wherein the automatic parking controller is configured to:
regenerate the information on the user location based on the first data after generating the unfolding signal; and
regenerate the folding signal when the user moves into a second region.

15. The vehicle of claim 12, wherein the automatic parking controller is configured to:
generate information on the surrounding object based on the first data; and
ignore the unfolding request and not generate the unfolding signal when the surrounding object is sensed in a second region from the vehicle.

16. An operation method of a vehicle when performing an automatic parking function, the method comprising:
initiating automatic parking;
collecting a state of a side mirror;
collecting data on regions around the vehicle;
generating a folding signal or an unfolding signal for the side mirror based on the state of the side mirror and the data; and
determining whether the automatic parking has been completed and storing a generation record of the folding signal,
wherein generating the folding signal or the unfolding signal for the side mirror based on the state of the side mirror and the data includes:
calculating a minimum folding based on a current speed of the vehicle, a distance between a surrounding object and the vehicle, and a time needed to complete folding of the side mirror, and
generating the folding signal based on the minimum folding distance, the distance between the surrounding object and the vehicle, and a change in a steering angle of the vehicle.

17. The method of claim 16, wherein collecting the data on the regions around the vehicle includes:
collecting first data on a region ahead of the vehicle and a region behind the vehicle through front and rear ultrasonic sensors; and
collecting second data on the region ahead of the vehicle, the region behind the vehicle, and a lateral region of the vehicle through omnidirectional cameras.

18. The method of claim 17, wherein, when the side mirror is not folded, generating the folding signal or the unfolding signal for the side mirror based on the state of the side mirror and the data includes:
generating information on a parking space based on the first data and the second data; and
determining whether the vehicle is able to enter the parking space through forward movement or backward movement only.

19. The method of claim 18, further comprising:
when the vehicle is not able to enter the parking space through the forward movement or the backward movement only, generating information on the surrounding object based on the first data and the second data;
determining whether the surrounding object is sensed within a third distance from the vehicle; and
generating the folding signal.

20. The method of claim 18, further comprising:
when the vehicle enters the parking space through the forward movement or the backward movement only, generating information on the surrounding object based on the first data and the second data;
determining whether a half of a difference of a width of the parking space from a full width of the vehicle is within a first distance;
when the half of the difference is greater than the first distance, determining whether the surrounding object is sensed within a second distance from the vehicle; and
generating the folding signal.

21. The method of claim 17, wherein, when the side mirror is folded, generating the folding signal or the unfolding signal for the side mirror based on the state of the side mirror and the data includes:
moving the vehicle by a fourth distance to a new location;
collecting the first data at the new location;
generating information on the surrounding object based on the first data; and
generating the unfolding signal when the surrounding object is not sensed within a fifth distance from the vehicle.

22. The method of claim 17, wherein generating the folding signal or the unfolding signal for the side mirror based on the state of the side mirror and the data includes:
receiving an unfolding request for the side mirror from an external device;
generating information on a user location and information on the surrounding object based on the first data;
determining whether there is the generation record of the folding signal;
determining whether the user location is within a first region; and
determining whether the surrounding object is sensed within a second region.

23. An operation method of a vehicle when performing an automatic parking function, the method comprising:
initiating automatic parking;
collecting a state of a side mirror;
collecting data on regions around the vehicle, wherein collecting the data on the regions around the vehicle includes:
collecting first data on a region ahead of the vehicle and a region behind the vehicle through front and rear ultrasonic sensors, and
collecting second data on the region ahead of the vehicle, the region behind the vehicle, and a lateral region of the vehicle through omnidirectional cameras;
generating a folding signal or an unfolding signal for the side mirror based on the state of the side mirror and the data, wherein, when the side mirror is not folded, generating the folding signal or the unfolding signal for the side mirror based on the state of the side mirror and the data includes:
generating information on a parking space based on the first data and the second data, and
determining whether the vehicle is able to enter the parking space through forward movement or backward movement only;
determining whether the automatic parking has been completed and storing a generation record of the folding signal;
when the vehicle enters the parking space through the forward movement or the backward movement only, generating information on the surrounding object based on the first data and the second data;
determining whether a half of a difference of a width of the parking space from a full width of the vehicle is within a first distance;
when the half of the difference is greater than the first distance, determining whether the surrounding object is sensed within a second distance from the vehicle; and
generating the folding signal.

* * * * *

UNITED STATES PATENT AND TRADEMARK OFFICE
CERTIFICATE OF CORRECTION

| | |
|---|---|
| PATENT NO. | : 11,845,382 B2 |
| APPLICATION NO. | : 17/342889 |
| DATED | : December 19, 2023 |
| INVENTOR(S) | : Choi et al. |

It is certified that error appears in the above-identified patent and that said Letters Patent is hereby corrected as shown below:

In the Claims

In Column 21, in Claim 15, Line 56, delete "claim 12," and insert -- claim 11, --.

Signed and Sealed this
Fifth Day of March, 2024

Katherine Kelly Vidal
*Director of the United States Patent and Trademark Office*